(12) United States Patent
Hsu et al.

(10) Patent No.: US 7,477,511 B2
(45) Date of Patent: Jan. 13, 2009

(54) REMOVABLE DEVICE

(75) Inventors: Yung-Chin Hsu, Taipei (TW);
Sheng-Tzu Yang, Taipei (TW)

(73) Assignee: Inventec Corporation, Taipei (TW)

( * ) Notice: Subject to any disclaimer, the term of this patent is extended or adjusted under 35 U.S.C. 154(b) by 302 days.

(21) Appl. No.: 11/395,950

(22) Filed: Mar. 30, 2006

(65) Prior Publication Data

US 2007/0230107 A1   Oct. 4, 2007

(51) Int. Cl.
*G06F 1/16* (2006.01)
(52) U.S. Cl. ...................................... 361/685
(58) Field of Classification Search ................ 361/685; 16/407
See application file for complete search history.

(56) References Cited

U.S. PATENT DOCUMENTS

| | | | | |
|---|---|---|---|---|
| 6,058,016 | A * | 5/2000 | Anderson et al. ............ | 361/685 |
| 6,272,010 | B1 * | 8/2001 | Schmitt ....................... | 361/685 |
| 6,288,902 | B1 * | 9/2001 | Kim et al. .................... | 361/725 |
| 6,325,353 | B1 * | 12/2001 | Jiang ........................... | 361/685 |
| 6,356,441 | B1 * | 3/2002 | Claprood .................... | 361/685 |
| 6,381,139 | B1 * | 4/2002 | Sun ............................. | 361/685 |
| 6,483,107 | B1 * | 11/2002 | Rabinovitz et al. .......... | 361/683 |
| 6,490,153 | B1 * | 12/2002 | Casebolt et al. ............. | 361/685 |
| 6,603,657 | B2 * | 8/2003 | Tanzer et al. ................ | 361/685 |
| 6,648,149 | B2 * | 11/2003 | Robertson ................... | 361/801 |
| 6,952,341 | B2 * | 10/2005 | Hidaka et al. ............... | 361/685 |
| 2004/0012921 | A1 * | 1/2004 | Hidaka et al. ............... | 361/685 |
| 2006/0056146 | A1 * | 3/2006 | Marcade et al. ............. | 361/685 |
| 2006/0067042 | A1 * | 3/2006 | Salinas et al. ............... | 361/685 |
| 2006/0232923 | A1 * | 10/2006 | Liang .......................... | 361/685 |
| 2007/0064385 | A1 * | 3/2007 | Paul et al. ................... | 361/685 |
| 2007/0188989 | A1 * | 8/2007 | Paul et al. ................... | 361/685 |
| 2007/0211422 | A1 * | 9/2007 | Liu et al. .................... | 361/685 |
| 2007/0230105 | A1 * | 10/2007 | Su .............................. | 361/685 |

* cited by examiner

*Primary Examiner*—Anatoly Vortman
*Assistant Examiner*—Adrian S Wilson
(74) *Attorney, Agent, or Firm*—Jianq Chyun IP Office

(57) ABSTRACT

A removable device is proposed, which includes a body, a removing handle, a panel, and a snap-fit element. The removing handle has one end pivotally connected to one side of the body and the other end formed with a snap-fit portion. The panel is disposed on the side of the body and is provided with an installation hole and an elastic portion located at the installation hole. The snap-fit element is installed in and partly covers the installation hole, for snap-fit engagement with the snap-fit portion of the removing handle. The snap-fit element includes an extending portion pressing against the elastic portion, such that the elastic portion provides the snap-fit element with the elasticity required to move in relation to the installation hole. Accordingly, the above removable device solves the drawbacks of complicated numerous constituent components of a conventional removable device.

8 Claims, 5 Drawing Sheets

REMOVABLE DEVICE

BACKGROUND OF THE INVENTION

1. Field of the Invention

This invention relates to a removable device, and more particularly, to a removable device having a removing handle.

2. Description of Related Art

Removable devices have been widely used in servo devices and personal computers. A servo device needs enormous storage space, thus it is typically equipped with a plurality of removable hard disk cartridges for holding hard disks. Each removable hard disk cartridge is hot-swappable, and it is swiftly replaced if necessary.

The removable hard disk cartridge is typically inserted into and thereby held in a slot of the servo device. It is pivotally connected to a removing handle having one end fixed to the servo device and the opposing end adapted for snap-fit engagement with the removable hard disk cartridge. This, coupled with the holding of the removable hard disk cartridge by the slot of the servo device, secures the removable hard disk cartridge in a blade server.

FIG. 1 is a schematic diagram illustrating a conventional structure for snap-fit engagement between a removing handle and a removable hard disk cartridge. A panel 10 and a flat spring 11 are disposed on one side of the removable hard disk cartridge 1. The panel 10 is formed with an installation hole 101 equipped with a ring 102. The flat spring 11 has one end connected to the removable hard disk cartridge 1 and the opposing end to an operating block 103. The ring 102 has a stopping function whereby the operating block 103 is kept outside the installation hole 101. The removable hard disk cartridge 1 is pivotally connected to the removing handle 12. One end of the removing handle 12 is formed with a flange 120 for snap-fit engagement with the end of the flat spring 11 connected to the operating block 103. Owing to the elasticity of the flat spring 11, the aforesaid snap-fit engagement is so firm that the removing handle 12 is secured in position.

Nevertheless, the aforesaid prior art has a drawback of having too many constituent elements, which results in a complicated, time-consuming assembly process.

Furthermore, an excessively great number of constituent elements also means increased fabrication costs. In this regard, both the flat spring 11 and the operating block 103 incur high fabrication costs in particular, because they are compact, nonstandard manufactures.

Therefore, the problem to be solved here is to provide a method for overcoming the drawbacks of the foregoing prior art.

SUMMARY OF THE INVENTION

In light of the drawbacks of the foregoing prior art, it is a primary objective of the present invention to provide a removable device composed of a reasonably small number of elements.

Another objective of the present invention is to provide a removable device of which assembly is fast and simple.

Yet another objective of the present invention is to provide a removable device which reduces the fabrication costs of its constituent elements.

In order to achieve the above and other objectives, the present invention provides a removable device which comprises a body, a removing handle, a panel, and a snap-fit element. The removing handle has one end pivotally connected to one side of the body and the other end formed with a snap-fit portion. The panel is disposed on one side of the body and provided with an installation hole and an elastic portion located at the installation hole. The snap-fit element is installed in and partly covers the installation hole, for snap-fit engagement with the snap-fit portion of the removing handle. The snap-fit element comprises an extending portion pressing against the elastic portion, such that the elastic portion provides the snap-fit element with the elasticity required to move in relation to the installation hole.

The body is applicable to a blade server, a removable hard disk cartridge, and an expansion card holder, such that the removable device is installed in a slot of an electronic device. The electronic device is, for example, a blade server frame, a servo device, or a personal computer. The removing handle further comprises a tenon corresponding to a slit disposed in the slot of the electronic device. The tenon of the removing handle snaps into the slit, thereby securing the removable device in position.

An opening is disposed on the front side of the body, whereas flanges are disposed on two opposite sides of the panel, so as to enable engagement between the body and the panel. A plurality of hooks, which match slits disposed in the body, are further installed on the panel, so as to enable engagement between the body and the panel.

Preferably, the axis about which pivotal connection between the removing handle and the body takes place is located at an edge of the front side of the body, so as to maximize moment arm and make operation labor-saving. The elastic portion is an elastic plate straddling the panel and is provided with a protruding plate which extends away from the body. The extending portion of the snap-fit element extends toward the body so as to engage with the elastic portion. The snap-fit element is further provided with hooks for fastening the snap-fit element to the installation hole and thereby installing the snap-fit element on the panel. The snap-fit portion is a barb disposed at an edge of the removing handle and adapted for snap-fit engagement with an edge of one side of the snap-fit element, and the edge of the side of the snap-fit element is provided with an anti-skid area for enhanced snap-fit engagement.

The operating portion is disposed on a snap-fit element surface not facing the body. The operating portion is manipulated and moved away from the removing handle. Owing to the operating portion, a bump is formed on a snap-fit element surface facing the body, such that the protruding plate is held between the bump and the extending portion, thereby putting the snap-fit element in a position where the snap-fit element is ready for snap-fit engagement with the snap-fit portion.

Unlike a conventional removable device composed of complicated numerous components, the removable device of the present invention achieves snap-fit engagement using only three components, namely the panel, the snap-fit element, and the removing handle, thus improving and simplifying the constituent components.

With improved, simplified constituent components, the removable device of the present invention is assembled faster and more easily.

Since the number of the constituent components is reduced, the removable device of the present invention incurs less die costs.

In short, the removable device of the present invention can overcome the drawbacks of conventional removable devices and thereby is highly industrial applicable.

BRIEF DESCRIPTION OF DRAWINGS

The present invention can be more fully understood by reading the following detailed description of the preferred embodiment, with reference made to the accompanying drawings, wherein.

DETAILED DESCRIPTION OF PREFERRED EMBODIMENTS

The following specific embodiments are provided to illustrate the present invention. Others skilled in the art will readily understand other advantages and functions of the present invention in accordance with the contents disclosed in this specification. The present invention can also be performed or applied by other different embodiments. Various modifications and changes based on different viewpoints and applications can be made in the details of the specification without departing from the spirit of the present invention.

It should be noted that the drawings are simplified schematic diagrams and only show components relating to the present invention. In practice, the layout of the components may be far more intricate.

Figure 1:
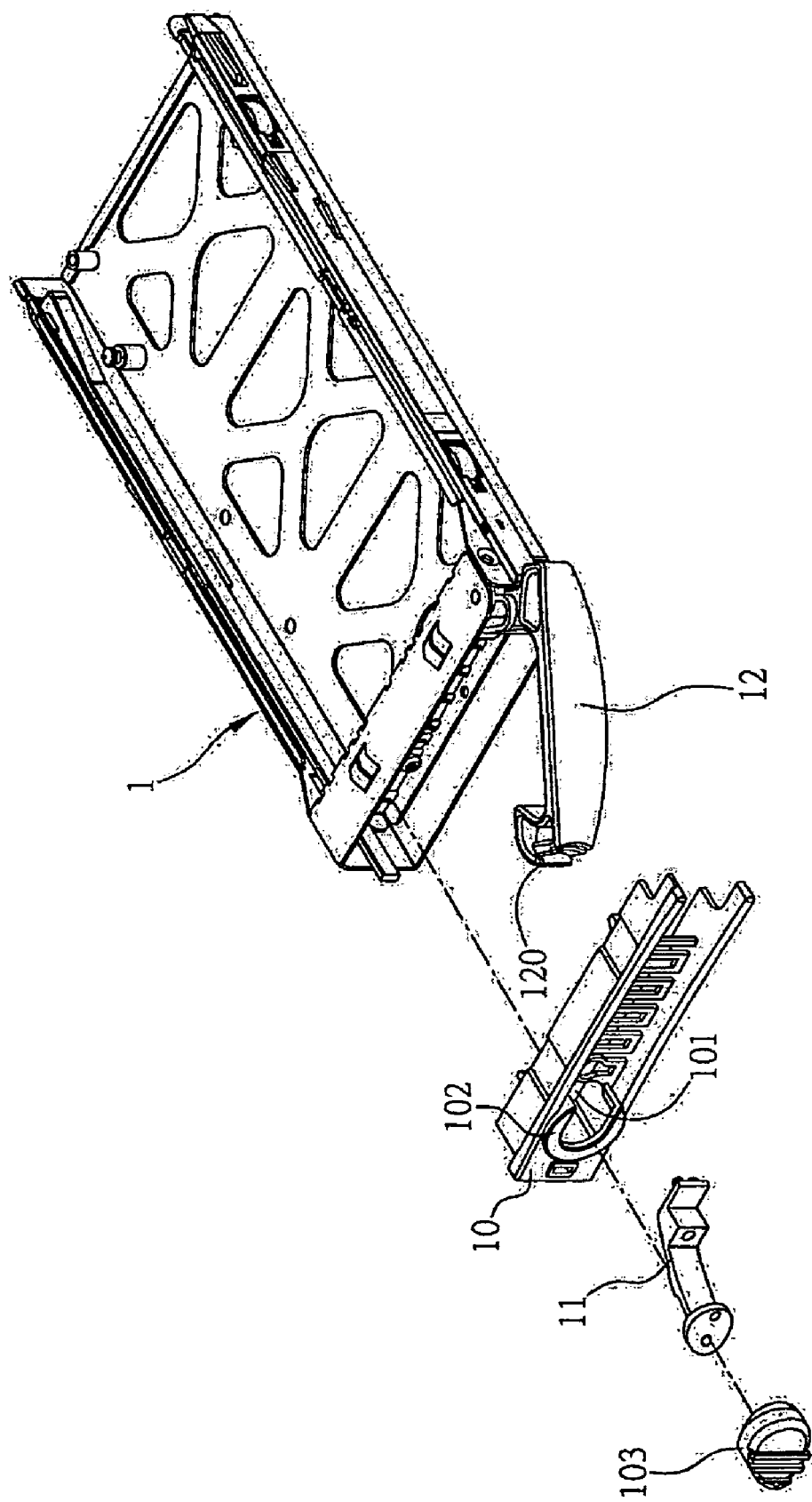
FIG. 1 shows a schematic view of a conventional removable device.
Figure 2:
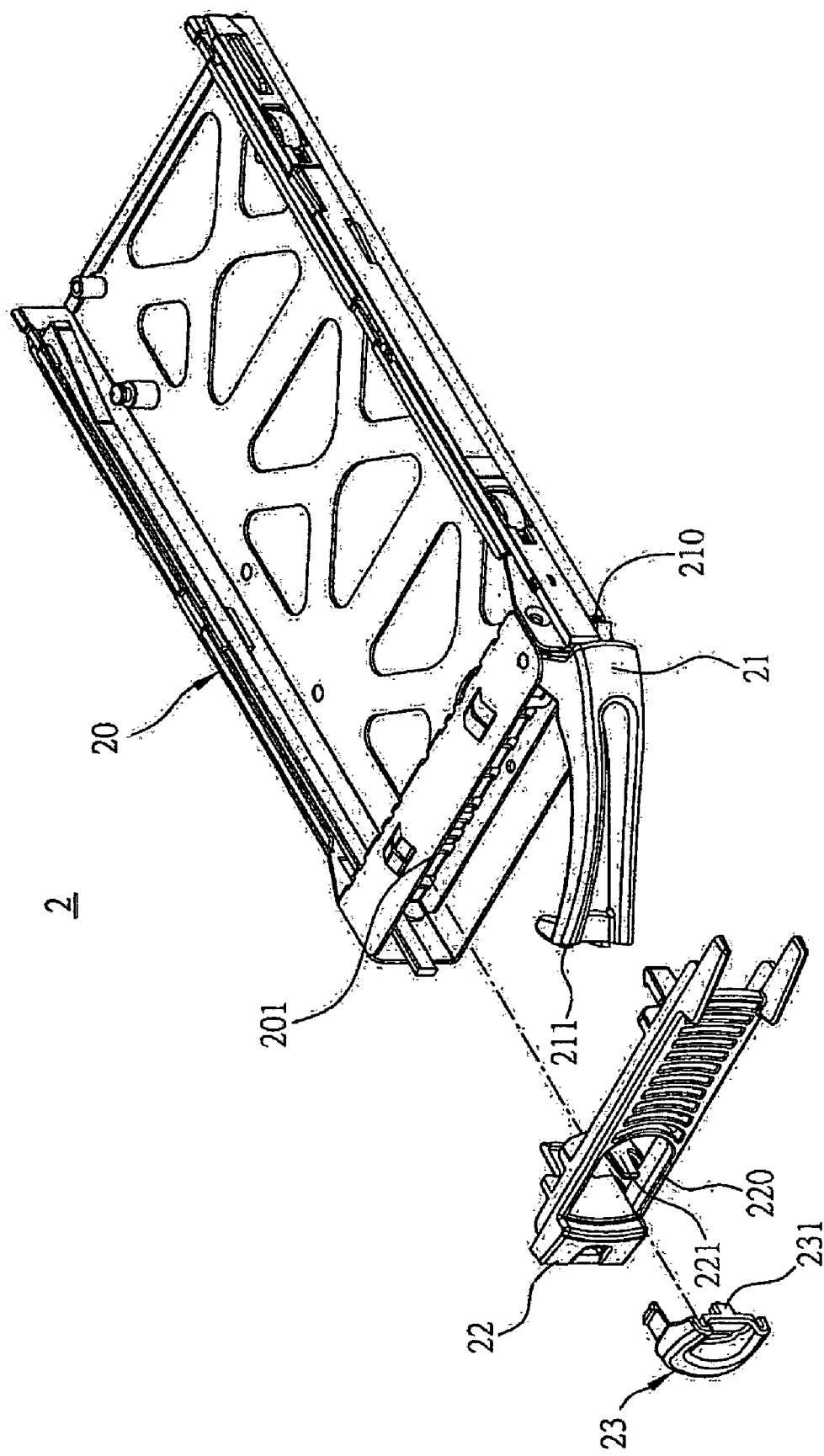
FIG. 2 shows an exploded view of a preferred embodiment for a removable device of the present invention.

FIG. 2 shows an exploded view of a preferred embodiment for a removable device of the present invention. The removable device 2 of the present invention comprises a body 20, a removing handle 21, a panel 22, and a snap-fit element 23. The removing handle 21 has one end pivotally connected to one side of the body 20 and the other end formed with a snap-fit portion 211. The panel 22 is disposed on a front side 201 of the body 20 and equipped with an installation hole 220 and an elastic portion 221 located at the installation hole 220. The snap-fit element 23 is installed in and partly covers the installation hole 220, for snap-fit engagement with the snap-fit portion 211 of the removing handle 21. The snap-fit element 23 comprises an extending portion 231 pressing against the elastic portion 221, such that the elastic portion 221 provides the snap-fit element 23 with the elasticity required to move in relation to the installation hole 220.

The body 20 is applicable to a blade server, a removable hard disk cartridge, and an expansion card holder, such that the removable device 2 is installed in a slot of an electronic device (none is shown). The electronic device is, for example, a blade server frame, a servo device, or a personal computer.

The removing handle 21 further comprises a tenon 210 corresponding to a slit (not shown) disposed in the slot of the electronic device. The tenon 210 of the removing handle 21 snaps into the slit, thereby securing the removable device 2 in position.

The front side 201 of the body 20 comprises an opening. The axis about which pivotal connection between the removing handle 21 and the body 20 takes place is located at an edge of the front side 201 of the body 20, so as to maximize moment arm and make operation labor-saving.

Figure 3:
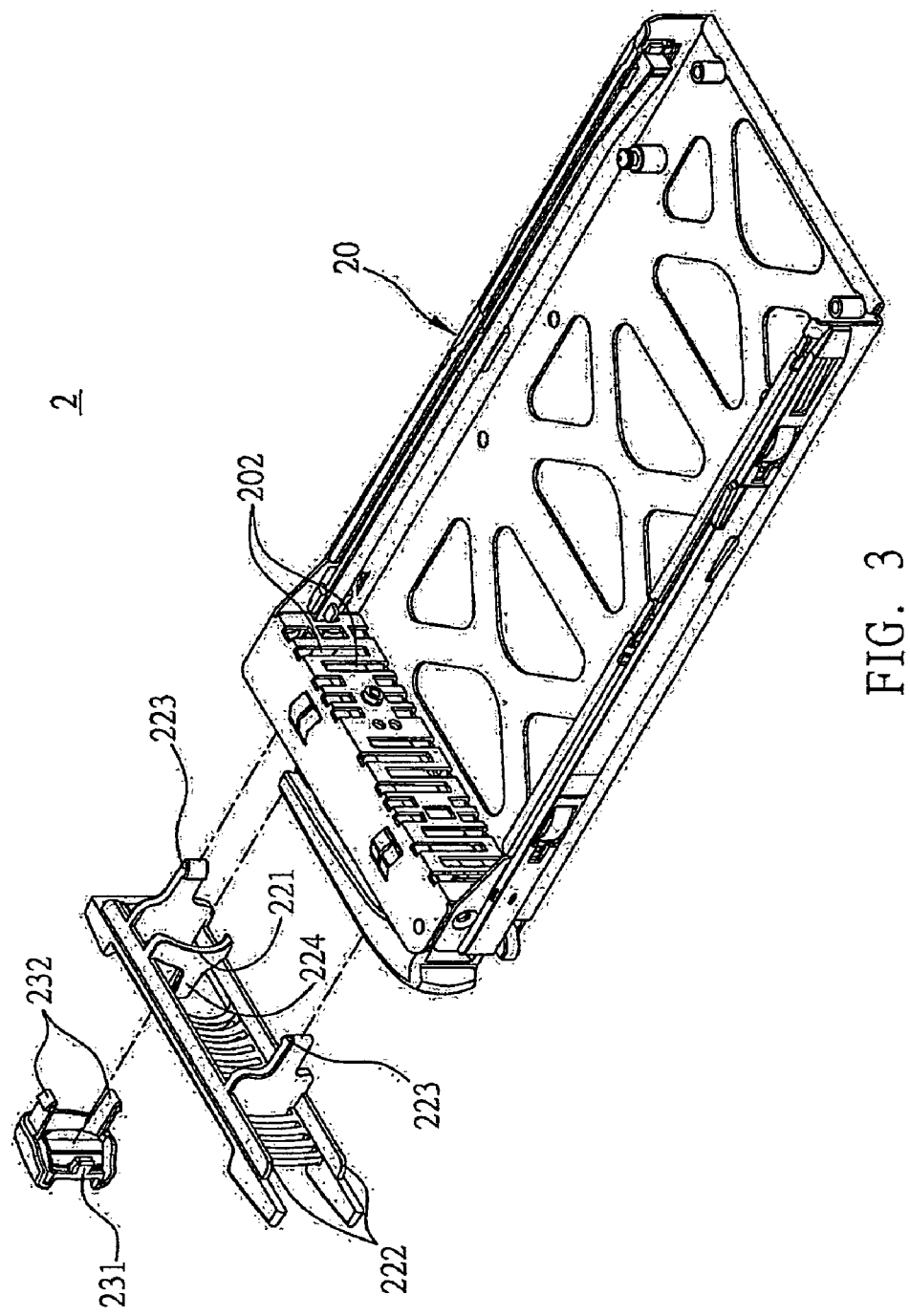
FIG. 3 shows an oblique exploded view of the removable device of the present invention.

Referring to FIG. 3, flanges 222, which are parallel to each other, are disposed on two opposite sides of the panel 22, so as to engage with the opening disposed on the front side 201. A plurality of hooks 223, which match slits 202 disposed in the body 20, are further installed on the panel 22, so as to enable engagement between the body 20 and the panel 22.

The elastic portion 221 is an elastic plate straddling the panel 22 and is provided with a protruding plate 224 which extends away from the body 20. The extending portion 231 of the snap-fit element 23 extends toward the body 20, so as to enable engagement between the protruding plate 224 of the elastic portion 221 and the extending portion 231 of the snap-fit element 23. The snap-fit element 23 is further provided with hooks 232 for fastening the snap-fit element 23 to the installation hole 220 and thereby installing the snap-fit element 23 on the panel 22.

Figure 4:
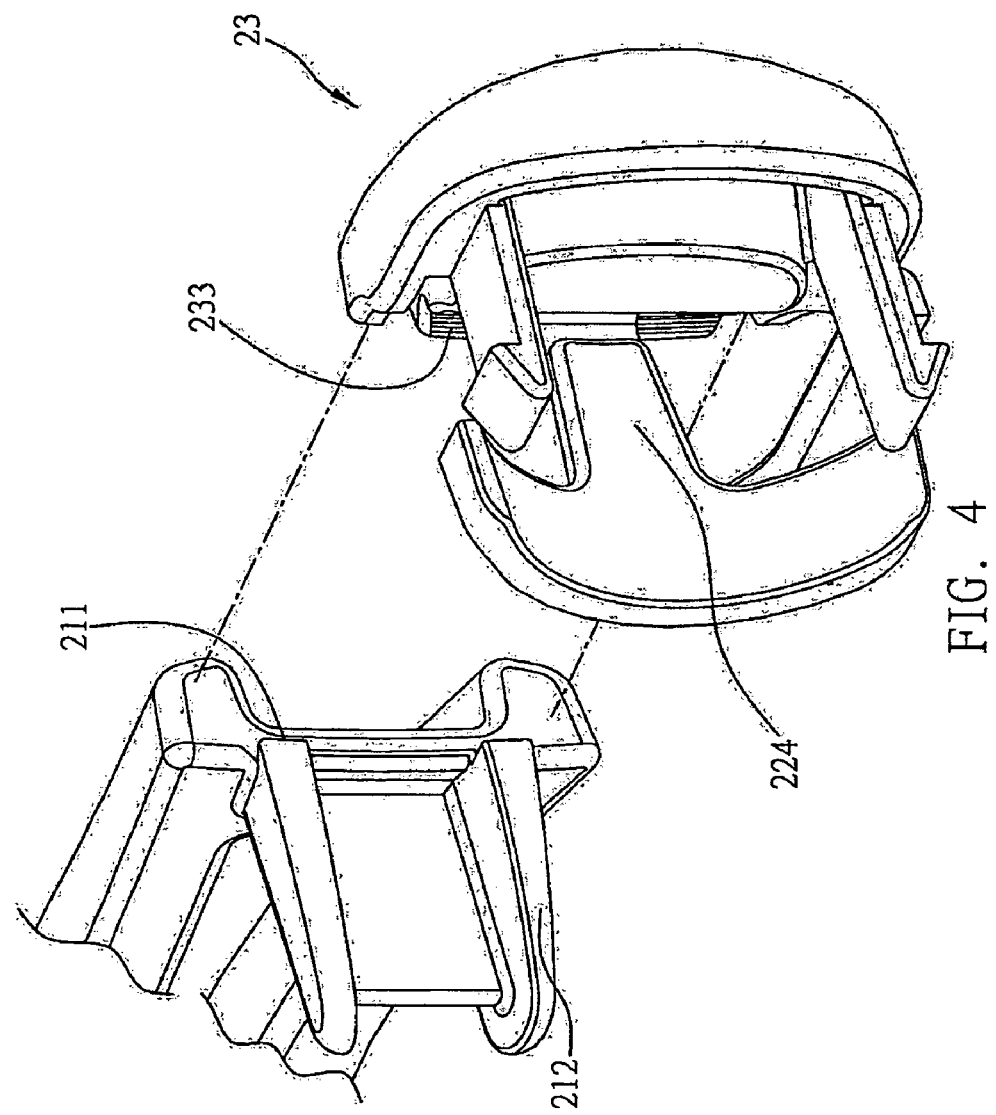
FIG. 4 shows a broken-out view of the removable device of the present invention.
Figure 5:
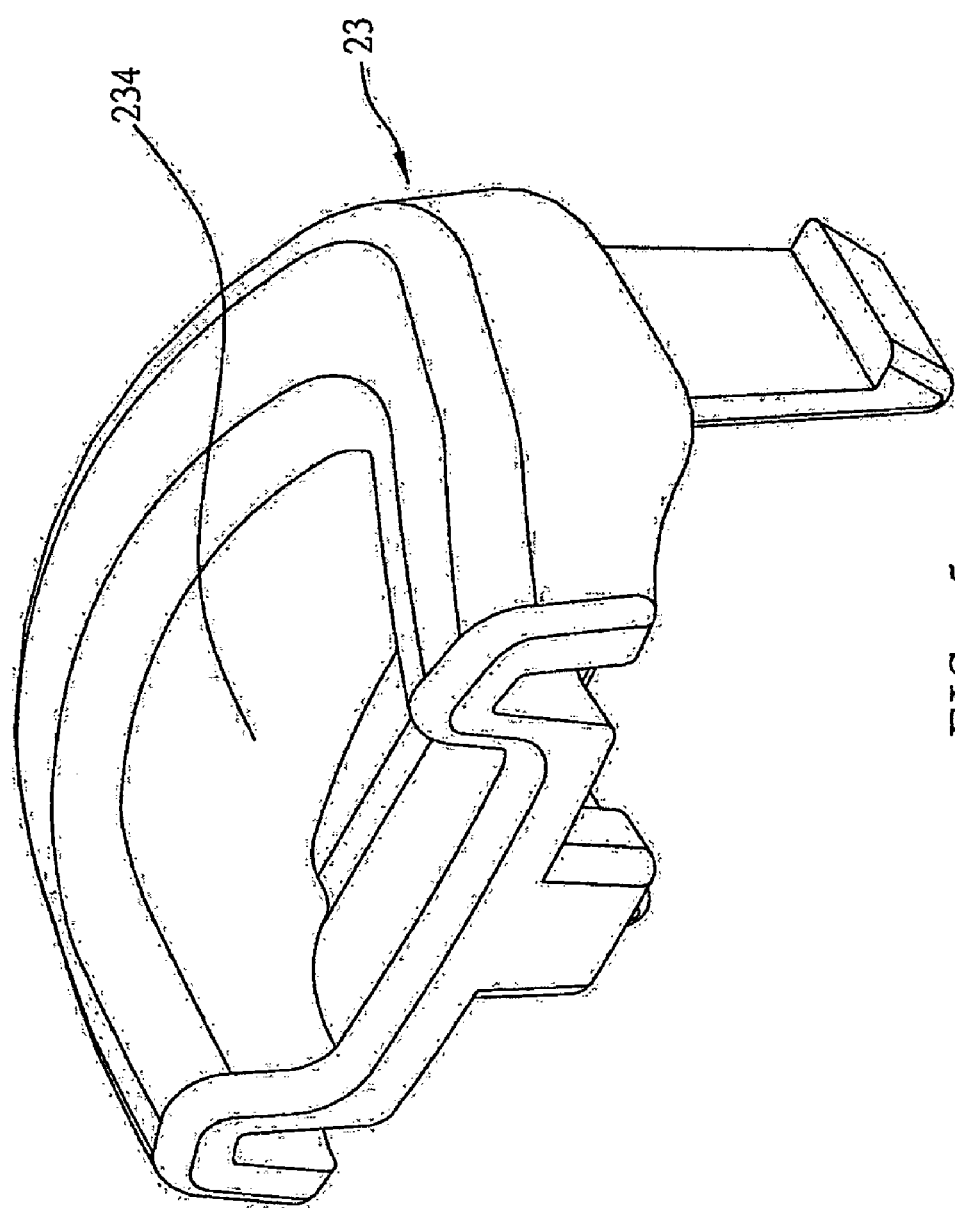
FIG. 5 shows a schematic view of one of the constituent components of the removable device of the present invention.

Referring to FIGS. 4 and 5, the snap-fit portion 211 is a barb disposed at an edge of the removing handle 21 and adapted for snap-fit engagement with an edge of one side of the snap-fit element 23, wherein the edge of the side of the snap-fit element 23 is provided with an anti-skid area 233 for enhanced snap-fit engagement.

An operating portion 234 is disposed on a snap-fit element 23 surface not facing the body 20. The operating portion 234 is manipulated and moved away from the removing handle 21. Owing to the operating portion 234, a bump (not shown) is formed on a snap-fit element 23 surface facing the body 20, such that the protruding plate 224 is held between the bump and the extending portion 231, thereby putting the snap-fit element 23 in a position where the snap-fit element 23 is ready for snap-fit engagement with the snap-fit portion 211.

Accordingly, snap-fit engagement is done as soon as the removing handle 21 is swung toward the panel 22 to the full; at that point, the tenon 210 has already snapped into a slit of the electronic device and thereby secured the body 20 in position. To unfasten the body 20, a user should pull the snap-fit element 23 to disengage the snap-fit portion 211, and then swing the removing handle 21; at that point, the tenon 210 is pressed against a side of the slit, thus the body 20 is pushed out of the slot of the electronic device.

Unlike a conventional removable device composed of complicated numerous components, the removable device of the present invention achieves snap-fit engagement using only three components, namely the panel 22, the snap-fit element 23, and the removing handle 21, thus improving and simplifying the constituent components.

With improved, simplified constituent components, the removable device of the present invention is assembled faster and more easily.

Since the number of the constituent components is reduced, the removable device of the present invention incurs less die costs.

In short, the removable device of the present invention can overcome the drawbacks of conventional removable devices and thereby is highly industrial applicable.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A removable device, comprising:
   a body;
   a removing handle having an end pivotally connected to a front side of the body and another end formed with a snap-fit portion;
   a panel disposed on the front side of the body and formed with an installation hole and an elastic portion located at the installation hole; and
   a snap-fit element installed in and partly covering the installation hole, for snap-fit engagement with the snap-fit portion of the removing handle, and the snap-fit element comprising an extending portion pressing against the elastic portion, such that the elastic portion provides the snap-fit element with elasticity required to move in relation to the installation hole, wherein the elastic portion is an elastic plate straddling the panel and is provided with a protruding plate which extends away from the body, and the extending portion of the snap-fit element extends toward the body, so as to enable engagement between the protruding plate of the elastic portion and the extending portion of the snap-fit element.

2. The removable device as recited in claim 1, wherein an axis about which pivotal connection between the removing handle and the body takes place is located at an edge of the front side of the body, so as to maximize moment arm and make operation labor-saving.

3. The removable device as recited in claim 1, wherein the snap-fit portion is a barb disposed at an edge of the removing handle and adapted for snap-fit engagement with an edge of a side of the snap-fit element.

4. The removable device as recited in claim 3, wherein an anti-skid area is disposed on the edge of the side of the snap-fit element, and the edge is adapted for the snap-fit engagement between the barb and the snap-fit element.

5. The removable device as recited in claim 1, wherein an opening is disposed on the front side of the body, and flanges parallel to each other are disposed on two opposite sides of the panel, so as to enable engagement between the body and the panel.

6. The removable device as recited in claim 1, wherein the panel is further provided with a plurality of hooks which match slits formed in the body, so as to enable engagement between the body and the panel.

7. The removable device as recited in claim 1, wherein the snap-fit element is further provided with hooks for fastening the snap-fit element to the installation hole so as to install the snap-fit element on the panel.

8. The removable device as recited in claim 1, wherein an operating portion is disposed on a surface of the snap-fit element facing away from the body such that the operating portion is manipulated and moved away from the removing handle.

* * * * *